Feb. 12, 1935.　　　　J. BRANDL　　　　1,990,633

DEVICE FOR MEASURING THE VOLUME OF FLOWING GAS

Filed Jan. 5, 1933　　　2 Sheets-Sheet 1

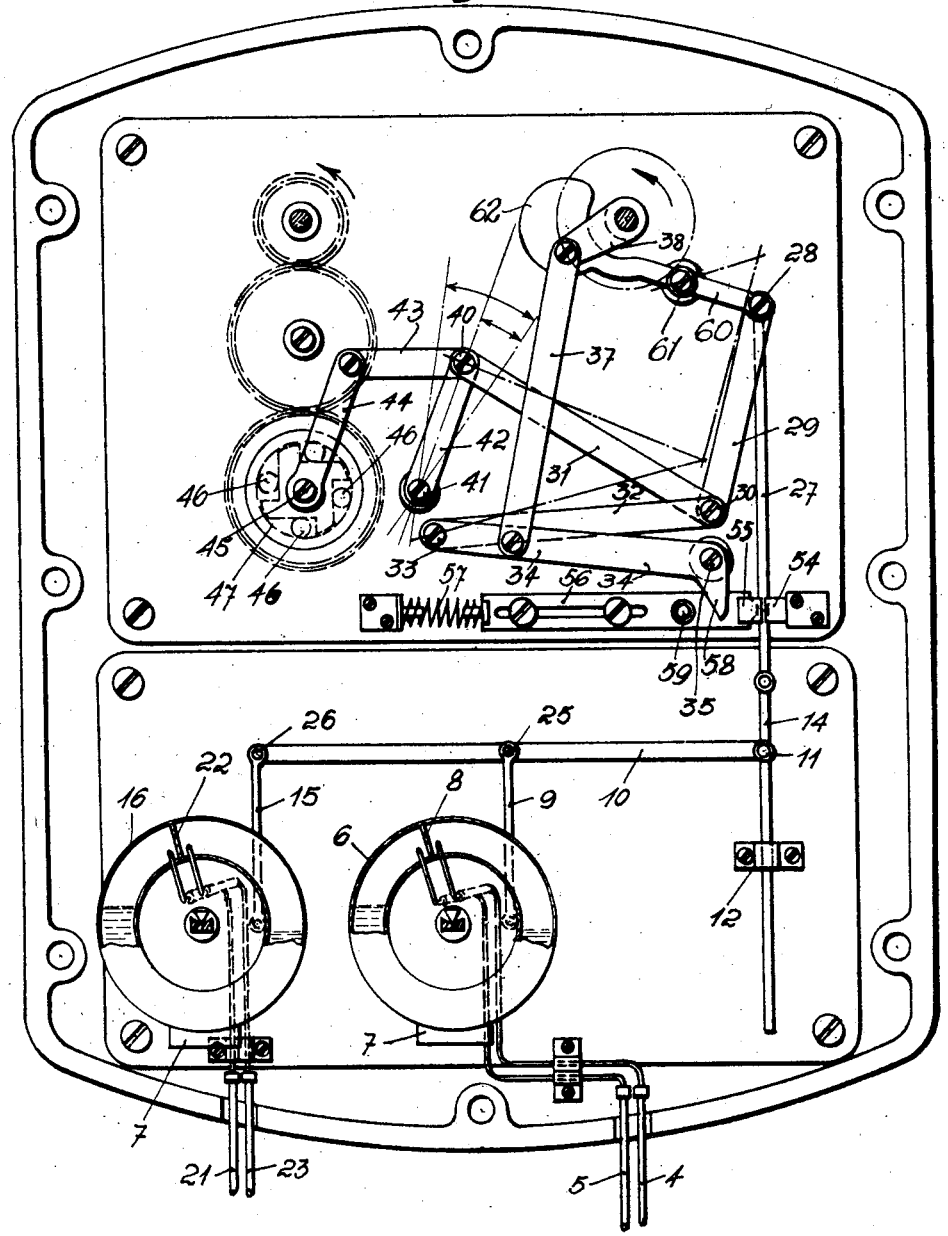

Patented Feb. 12, 1935

1,990,633

UNITED STATES PATENT OFFICE 1,990,633

DEVICE FOR MEASURING THE VOLUME OF FLOWING GAS

Johann Brandl, Vienna, Austria, assignor to the firm Compagnie pour la Fabrication des Compteurs et Materiel d'Usines à Gaz, Montrouge (Seine), France Application January 5, 1933, Serial No. 650,226
In Austria January 16, 1932

3 Claims. (Cl. 73—167)

This invention relates to an improved device for measuring the volume of flowing gases. Devices are already known for this purpose in which the pressure, the density, and the temperature of the gas effect a correction of the reading of the counting mechanism, so that the latter indicates for direct reading the volume of gas reduced to normal. The device according to the present invention is far simpler than the known types, but at the same time ensures a high degree of accuracy. The novelty of this device consists in the fact that the mechanism actuating the counter is driven by a motor adapted to run at constant speed, and includes a member which can be moved by regulating means adapted to respond both to the action of the gas measuring device and to that of the instruments which register the state of the gas as regards pressure, density, and temperature. By this movement of the said member the transmission ratio between the motor and the counting mechanism may be varied between a maximum value and zero. The gas measuring device itself may be any one of various types, for instance of the well-known type which works on the flow principle, in which the difference of pressure between the two sides of a constriction in the gas supply line is caused to move a member. According to the present invention this member in its turn acts upon the regulating means governing the mechanism which transmits the drive from the motor to the counter.

A constructional example of a gas measuring device according to the invention is illustrated in the accompanying drawings, in which:

Fig. 2 shows the measuring mechanism proper in side elevation.

Figure 1:
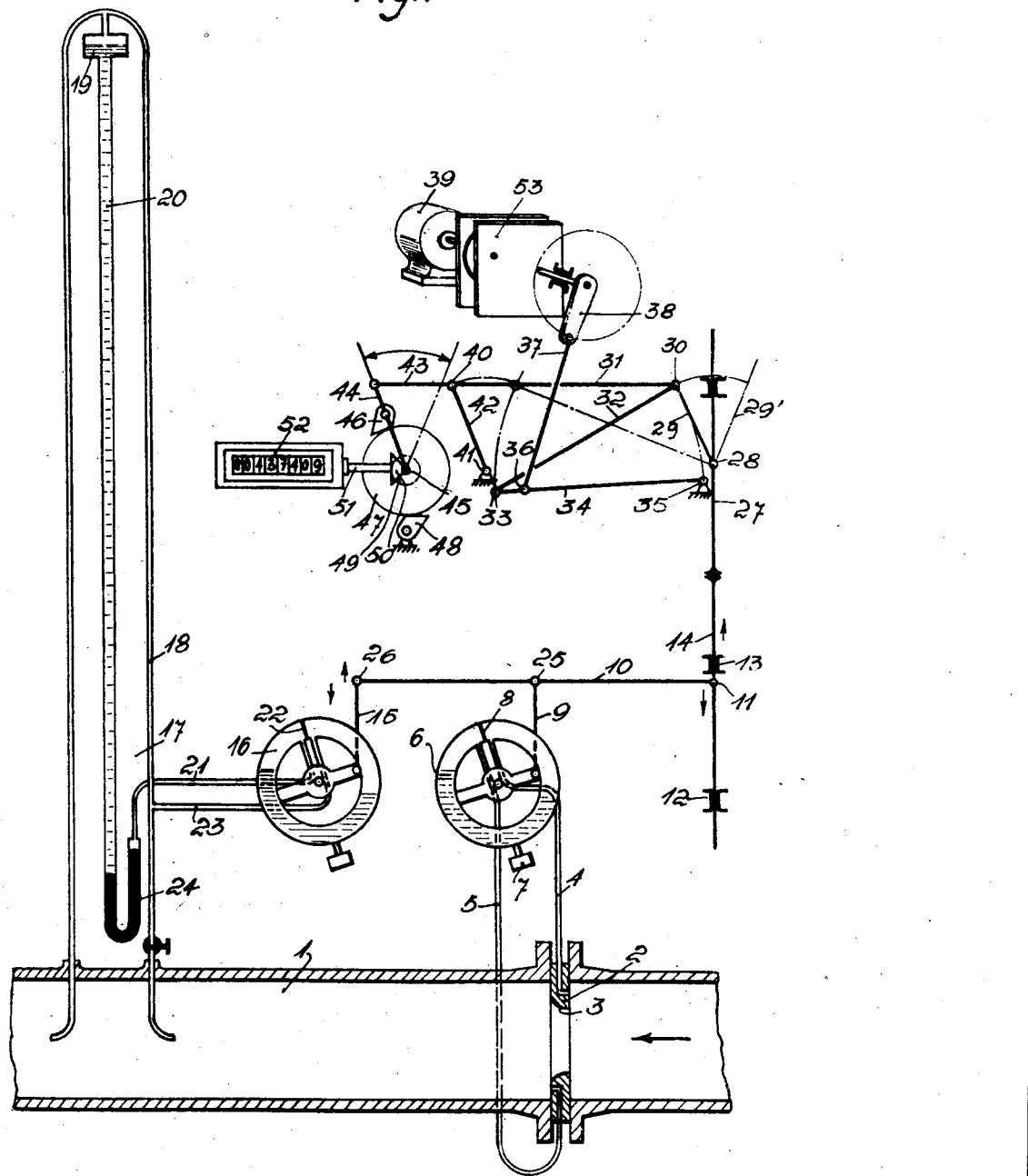
Fig. 1 shows diagrammatically the essential parts and the lay-out of the device.

Referring to the drawings, there is interposed in the gas supply pipe a throttle plate 2 the aperture 3 of which is of smaller cross-sectional area than the bore of the pipe 1, so that a considerable difference of pressure occurs as between the gas on one side of this plate and that on the other side of the same. From the space in front of the plate 2 and from the space behind the plate 2 there are branched off by-pass pipes 4 and 5, respectively, and these pipes are taken to a ring balance 6, and issue one on each side of the partition 8 in the ring of the latter which is partly filled with mercury and provided with a counterweight 7. According to the magnitude of the pressure difference between the two sides of the plate 2 the angular setting of the ring balance will vary. The ring balance 6 is pivotally connected, by means of a link 9, to a lever 10 the end 11 of which is pivoted to the slide 14 guided in the bearings 12 and 13.

The lever 10 is pivotally connected at a second point to a link 15 which is pivoted to a second ring balance 16 adapted to be influenced by a gas density meter 17. This density meter consists, in the constructional example shown in the drawings, of a U-shaped tube 18 having its flexed portion uppermost and the ends of its two limbs extending into the interior of the pipe 1. The ends of these two limbs are bent outwards, and that in such a manner that the orifice of the one bent end faces up-stream, while the orifice of the other bent end faces down-stream. To the crest of the said U-tube 18 there is connected a vessel 19 from which there proceeds a downwardly directed tube 20 which is upwardly returned at its lower end, and from which a tube 21 extends to the ring balance 16 and issues on one side of the partition 22, while on the other side of this partition there issues a tube 23 which is branched from the tube 18. The lower U-shaped portion of the tube 20 is filled with mercury 24, and the long upwardly extending portion of the same, up to and into the enlarged portion or vessel 19, is filled with a specifically lighter liquid. From the gas flowing through the pipe 1 a certain quantity flows upwards through the inverted U-tube 18 and then back into the pipe 1, and that at a very slight rate of flow. Since the rate of flow of the gas through the U-tube 18 is so low as to be in practice negligible, the pressure difference as between the tubes 23 and 21 corresponds approximately to the weight of the column of gas in the right-hand limb of the U-tube 18, and it will be clear that in this manner very accurate measurement of the density (specific gravity) of the gas can be effected. The ring balance 16 will assume different positions of angular adjustment according to the density of the gas at any one time, and the movement of this ring balance 16 influences the lever 10 through the link 15.

The lever 10 has no fixed pivot or fulcrum; either one of the points 11, 25, and 26 is capable of becoming the pivot or fulcrum of this lever at any one time. It will be clear that the different positions of the ring balances 6 and 16 will result in different positions of the slide 14. Adjoining this slide 14 by means of a suitable connection which is a pivotal one in Fig. 2 there is provided a rod 27 to which there is pivoted at 28 the arm 29 the end 30 of which is pivotally connected on the one hand to the thrust rod 31, and on the other hand to the link 32. This link 32 is pivotally connected, in its turn, with its end 33 to the free end of a link 34 which is adapted to oscillate about the fixed axis 35. Links 31 and 34, in general, are of different length, but in special cases they may happen to be of the same length. The link 34 is pivoted at 36 to the connecting rod 37 of a crank arm 38 which is driven by an electro-motor 39 adapted to run at constant speed. Through the agency of the connecting rod 37 the crank arm 38, on being rotated, causes the two links 32 and 34 to rock about the fixed pivot point 35, the point 30 being guided by the arm 29 which is pivoted at 28. This arm 29 is thereby brought into the chain-dotted position shown in the drawing (Fig. 1) at 29'. The movements of the point 30 also act upon the thrust rod 31 the end point 40 of which is pivoted to the arm 42 adapted to rock about the fixed pivot 41, so that this arm 42 together with the rod 43 and the arm 44 constitute a parallelogram of links. The arms 29 and 42, in general, are of different length, but in special cases they may happen to be of the same length. The arm 44 is pivoted on the axle 45, and carries a clamping cheek 46 which is adapted to come into frictional engagement with the peripheral surface of the disc 47 at every movement of the arm 44 towards the left, whereas during the movement of the arm 44 towards the right this clamping cheek 46 slides idly round the disc 47. The disc 47 is thus intermittently rotated by the reciprocating movement of the arm 44. The clamping cheek 48 serves for the retention of the disc during the return movement of the arm 44. In the modification shown in Fig. 2 the clamping cheek 46 of Fig. 2 is constructed in a manner well-known in the art as a clamping clutch which couples the disc 47 loosely mounted on the axle 45, with this axle only when the arm 44 is rocked counter-clockwise.

Rigidly connected to the disc 47 there is a bevel wheel 49 which engages a bevel gear wheel 50 keyed to the shaft 51 of the counting mechanism 52, so that the counter 52 is thus driven by the arm 44. The movements of this arm 44 are set up, however, by the thrust rod 31 which in its turn is reciprocated by the rocking movement of the link 32 pivoted to the arm 34 and pivoted to 29.

The link 32 is of the same length as the arm 34, so that when the rod 27 is moved downwards the link 32 can be likewise drawn down by the arm 29 until finally the pivot 30 coincides with the fixed pivot 35. In this event the angle between the link 32 and the arm 34 is equal to nought. When the rod 27 is moved upwards this angle increases up to a maximum determined by the construction of the device. It will be clear that the thrust rod 31 participates in these tilting movements of the link 32. If the angle between the arm 34 and the link 32 be equal to nought, that is to say if the points 30 and 35 be coincident, the crank drive 38, 37 acting upon the link 32 only has the effect of rocking the two coinciding rods 32 and 34 about the point 35. The point 30 then remains stationary, and the parallelogram of links 42, 43, and 44 therefore remains at rest. The deflections of this parallelogram, and therefore also of the arm 44 commence, however, as soon as the link 32 begins to be lifted clear of the arm 34, and the movement or throw of the arm 44 becomes greater the greater the angle between 32 and 34 becomes. The increasing or diminishing of this angle is effected by the movement of the rod 27, and according to the setting of this rod the movement of the motor 39 is transmitted to the counter 52 to an extent which varies from zero to a certain maximum value. The rod 27 thus acts as a governing member for the mechanism which transmits the movement of the motor to the counter, and this governing member is influenced, as already mentioned, by the lever 10 which in its turn is actuated in response to the registering movements of the flow measuring device 6 and of the density measuring device 16. When there is no flow of gas in the pipe 1 the ring balance 6 is so set that the slide 14, and with it the rod 27, is drawn down to such an extent that the angle between 32 and 34 is equal to nought. The counting mechanism then ceases to be driven, although the motor 39 continues to run at unaltered speed. As the flow of gas in the pipe 1 increases the rods 14 and 27 are lifted, and, if the ratios of movement and transmission be correctly determined, the counter registers the correct volume of gas.

If the density of the gas fluctuates, the degree of influence exerted by the ring balance 6 upon the rods 14 and 27 is modified by the ring balance 16, and that in such a manner (if the proportions and ratios be correctly determined) that the correct volume of gas, reduced to normal density, can be read off the counter.

A precondition for the correct functioning of the entire device is that the motor 39 shall run at constant speed, and, in order to achieve this, governing means 53 can be interposed between the motor 39 and the crank 38.

It will be understood that the kind and number of devices responsive to physical conditions of the gas and connected to the lever 10 are not limited to the special and preferred means shown in Fig. 1. However, it is not necessary to describe further examples, since the constructional features of such devices are well-known in the art and do not constitute an essential part of the present invention. The same applies to the mechanism for the transmission of movement from the motor to the counter, as this mechanism may be constructed on various lines, provided only that the transmission ratio of movement can be influenced by a governing member so as to be variable from zero to a desired maximum value.

The form of construction shown in Fig. 2 corresponds exactly in principle to the arrangement shown in Fig. 1. The gas supply pipe 1 with the throttle plate 2, the parts 17 to 20 of the density meter, and the motor 39 are merely not shown. Since in both figures of the drawings like reference characters are used for like parts, the construction shown in Fig. 2 will be clear without further explanation. It is only necessary to point out that 54 and 55 denote two brake blocks adapted to act upon the rod 27, the end 28 of which is connected to a two-armed lever 60 mounted upon the axle 61 and carrying a counterweight 62 which balances the mass effect of the oscillating parts of the mechanism. The block 54 is stationary, while the block 55 is attached to and moves with the slide 56. This slide 56 is under the action of a spring 57 which tends to press the block 55 against the rod 27. The link 34 is provided with a cam 58 which engages a stop 59 on the slide 56, when the crank 38 is at top dead center, and retracts the brake block 55 from the rod 27. The rod 27 is thus almost always held fast by the action of the brake blocks 54 and 55; only at a dead center position of the crank 38 is the rod 27 liberated and capable of being readjusted by the lever 10 with a view to the ultimate influencing of the counting mechanism. At all other positions of the crank 38 the rod 27 is held fast, and there can thus be no reactive or recoil effect of the movement of the crank 38 and of the system of rods connected thereto upon the elements 6 and 16 of the device. The pivot point 28 is thus stationary during the greater part of the movement of the entire mechanism, and is only liberated for movement at a dead center position at which no reactive or recoil effect of the link mechanism upon the parts 6 and 16 can take place. It will be easily understood that the relative position of pivot 28 to link 31 does not affect the principles on which the device is constructed and that accordingly this pivot 28 while I have shown it in Fig. 1 to be below link 31, may as well be arranged above this link 31 as illustrated by way of example in Fig. 2.

I claim:

1. An apparatus for metering the volume of gas flowing through a conduit, comprising a plurality of devices connected to said conduit and responsive to physical conditions of the gas, a movable member, means whereby said member is subjected to the combined influence of said devices so as to effect a control movement which at any time and solely depends on the variations of volume of the gas, a driving mechanism constructed and arranged to run at a constant speed throughout the operation of the apparatus, a counting mechanism, a rocking lever-and-link system inter-connecting both mechanisms and adapted to pass the driving movement on to the counting mechanism at a transmission ratio which is variable from zero to a maximum value, and governing means inserted between the said member and an active point of the said lever-and-link system and adapted to act upon the latter under the influence of the said control movement of the member and to effect thereby variations of the transmission ratio between the driving and counting mechanism, which correspond to the variations in volume of the flowing gas.

2. An apparatus for metering the volume of gas flowing through a conduit, comprising a plurality of devices responsive to physical conditions of the gas and adapted to be connected to said conduit, a movable member, means whereby said member is subjected to the combined influence of said devices so as to carry out control movements which at any time and solely correspond to the variations in volume of the gas to be measured, a counting mechanism, a driving mechanism constructed and arranged to run at a constant speed throughout the operation of the apparatus, a rocking lever-and-link system interconnecting both mechanisms so as to pass the driving movement on to the counting mechanism at a transmission ratio which is variable from zero to a maximum value, said system including a fixed fulcrum, a lever arranged to rock about said fulcrum, a driving connection between said driving mechanism and said lever for imparting a rocking movement to the latter, a second lever pivotally connected to the free end of the first mentioned lever so as to permit both levers to form at their joint an angle which is variable from zero to a maximum value, and a link system connecting said counting mechanism to the said second lever at a point thereof which has the same distance from the joint between both levers as the said fulcrum, said second lever having a control connection with the said movable member whereby the control movement of the latter is transmitted to the said second lever to effect angular displacements thereof in relation to the first-mentioned lever and which correspond to the variations in volume of the flowing gas.

3. An apparatus as claimed in claim 1 wherein one of the said devices responsive to physical conditions of the gas is a flow-metering device of the orifice-type, while the other device is a gas-density meter, and the said movable member is so connected to both devices as to eliminate the influence of gas density variations upon the control movement which controls the action of the said governing means.

JOHANN BRANDL.